US009568026B2

(12) United States Patent
Yoshimoto et al.

(10) Patent No.: US 9,568,026 B2
(45) Date of Patent: Feb. 14, 2017

(54) ELECTRIC MOTOR-DRIVEN BOOSTER

(75) Inventors: Masayuki Yoshimoto, Kanagawa (JP); Ryozo Ikeuchi, Kanagawa (JP); Ryo Sekiya, Kanagawa (JP); Hideaki Ishii, Kanagawa (JP); Kazumoto Sano, Kanagawa (JP); Hiroshi Shigeta, Kanagawa (JP); Naoki Shirakawa, Kanagawa (JP); Ryoichi Yagi, Kanagawa (JP); Masami Abe, Kanagawa (JP)

(73) Assignees: NISSAN MOTOR CO., LTD., Kanagawa (JP); HITACHI AUTOMOTIVE SYSTEMS, LTD., Ibaraki (JP)

( * ) Notice: Subject to any disclaimer, the term of this patent is extended or adjusted under 35 U.S.C. 154(b) by 811 days.

(21) Appl. No.: 13/825,910

(22) PCT Filed: Oct. 24, 2011

(86) PCT No.: PCT/JP2011/074444
§ 371 (c)(1),
(2), (4) Date: Jun. 21, 2013

(87) PCT Pub. No.: WO2012/060238
PCT Pub. Date: May 10, 2012

(65) Prior Publication Data
US 2013/0263588 A1    Oct. 10, 2013

(30) Foreign Application Priority Data
Nov. 1, 2010  (JP) .................... 2010-245668

(51) Int. Cl.
*B60T 13/74* (2006.01)
*F15B 15/08* (2006.01)

(52) U.S. Cl.
CPC ............ *F15B 15/08* (2013.01); *B60T 13/745* (2013.01)

(58) Field of Classification Search
CPC .. B60T 13/745; B60T 13/746; B60T 2220/04; H02K 7/06
(Continued)

(56) References Cited

U.S. PATENT DOCUMENTS 3,751,919 A * 8/1973 Ron .................. B60T 13/162
60/553
5,551,764 A * 9/1996 Kircher ................. B60T 7/042
188/156
(Continued)

FOREIGN PATENT DOCUMENTS

| CN | 101318503 | 12/2008 |
| JP | 2008-162482 | 7/2008 |
| JP | 2009-208524 | 9/2009 |

OTHER PUBLICATIONS

Office Action issued Nov. 18, 2014 in corresponding Japanese patent application No. 2010-245668 (with English translation).
(Continued)

*Primary Examiner* — F. Daniel Lopez
*Assistant Examiner* — Richard Drake
(74) *Attorney, Agent, or Firm* — Wenderoth, Lind & Ponack, L.L.P.

(57) ABSTRACT

In an electric motor-driven booster, a sharp change of reaction force to an operation of a brake pedal is reduced to improve the brake pedal operation feeling. Operation of the brake pedal causes an input rod (34) and an input piston (32) to advance, and an electric motor (40) is driven according to the movement of the input piston to propel a primary piston (10) through a ball-screw mechanism, thereby generating a desired brake hydraulic pressure in a master cylinder. At this time, the input piston receives the hydraulic pressure in the master cylinder to feed back a part of reaction force during braking to the brake pedal. When the brake pedal is further depressed after the output of the electric motor has reached
(Continued)

a maximum output and the primary piston 10 has stopped, a lock nut abuts against a movable spring retainer and compresses a reaction force spring.

11 Claims, 7 Drawing Sheets

(58) Field of Classification Search
USPC .......................................................... 60/545
See application file for complete search history.

(56) References Cited

U.S. PATENT DOCUMENTS

| | | | | |
|---|---|---|---|---|
| 5,819,633 | A * | 10/1998 | Satoh | B60T 13/575 91/369.2 |
| 6,634,724 | B2 * | 10/2003 | Kobayashi | B60T 8/3265 188/1.11 E |
| 6,684,728 | B2 * | 2/2004 | Higuchi | F16H 25/2252 74/424.91 |
| 7,425,042 | B2 * | 9/2008 | Fujiwara | B60T 7/042 303/114.1 |
| 8,011,184 | B2 | 9/2011 | Ohtani et al. | |
| 2002/0149268 | A1 * | 10/2002 | Yamada | B29C 45/5008 307/143 |
| 2009/0090585 | A1 * | 4/2009 | Sikorski | B60T 7/042 188/1.11 E |
| 2009/0178404 | A1 * | 7/2009 | Ikeda | B60T 13/745 60/545 |

OTHER PUBLICATIONS

Office Action issued Nov. 2, 2014 in corresponding Chinese patent application No. 201180047648.9 (with English translation).
International Search Report issued Dec. 13, 2011 in International (PCT) Application No. PCT/JP2011/074444.
International Preliminary Report on Patentability issued May 7, 2013 in International Application No. PCT/JP2011/074444 with English translation.
Office Action issued Nov. 10, 2014 in corresponding Japanese patent application No. 2010-245668 (with English translation).

* cited by examiner

ELECTRIC MOTOR-DRIVEN BOOSTER

TECHNICAL FIELD

The present invention relates to boosters incorporated in brake systems of automobiles and other vehicles, and, more particularly, to an electric motor-driven booster using an electric motor-driven actuator as a boost source.

BACKGROUND ART

A publicly known electric motor-driven booster is disclosed, for example, in Patent Literature 1. The electric motor-driven booster has an input rod connected to a brake pedal, a booster piston relatively movably fitted around the input rod, an electric motor for driving the booster piston, and a controller for controlling the operation of the electric motor according to the movement of the input rod. The input rod and the booster piston propel a piston in a master cylinder, and driving force of the electric motor is applied to obtain a desired boost ratio with respect to the operating force of the brake pedal.

In other words, the boost ratio can be varied by adjusting the relative positional relationship between the input rod and the booster piston, and thus it is possible to execute various brake control operations, such as boost control, brake assist control, regenerative cooperative control, and so forth. In the event of a failure in the electric motor or the like, the input rod directly operates the booster piston, thereby enabling the braking function to be maintained.

CITATION LIST

Patent Literature

Patent Literature 1: Japanese Patent Application Publication No. 2008-162482

SUMMARY OF INVENTION

Technical Problem

The above-described conventional electric motor-driven booster, however, has the following problems. When the driver depresses the brake pedal, the input rod advances, causing the electric motor to propel the booster piston, thus causing the hydraulic pressure in the master cylinder to increase with a predetermined boost ratio according to the amount of operation of the brake pedal. When the output of the electric motor reaches its maximum output and the thrust of the booster piston and the reaction force from the hydraulic pressure in the master cylinder balance with each other, the booster piston stops and cannot advance further (full-load state). If the brake pedal is further depressed thereafter, the input rod alone advances and abuts against the booster piston at rest. At this time, the driver feels an uncomfortable sensation as if the brake pedal had been fixed suddenly.

The present invention has been made in view of the above-described circumstances, and an object of the present invention is to provide an electric motor-driven booster capable of reducing a sharp change in the rate of increase in the reaction force with respect to the operation of the brake pedal, thereby improving the brake pedal operation feeling.

Solution to Problem

To solve the above-described problem, the present invention provides an electric motor-driven booster comprising an input member movable to advance and retract in response to an operation of a brake pedal, a boosting member provided to be movable relative to the input member and to abut against the input member when the input member advances, and an electric motor-driven actuator adapted to drive the boosting member, wherein the operation of the electric motor-driven actuator is controlled based on the movement of the input member so as to adjust the relative positions of the input member and the boosting member to generate a brake hydraulic pressure in a master cylinder with a desired boost ratio. The electric motor-driven booster is provided with a reaction force application device adapted to abut against the input member to apply a reaction force to the movement of the input member when the input member advances by a predetermined distance in response to the operation of the brake pedal.

Advantageous Effects of Invention

The electric motor-driven booster according to the present invention can reduce a sharp change in the rate of increase in the reaction force with respect to the operation of the brake pedal, thereby improving the brake pedal operation feeling.

DESCRIPTION OF EMBODIMENTS

One embodiment will be explained below in detail with reference to the drawings.

Figure 1:
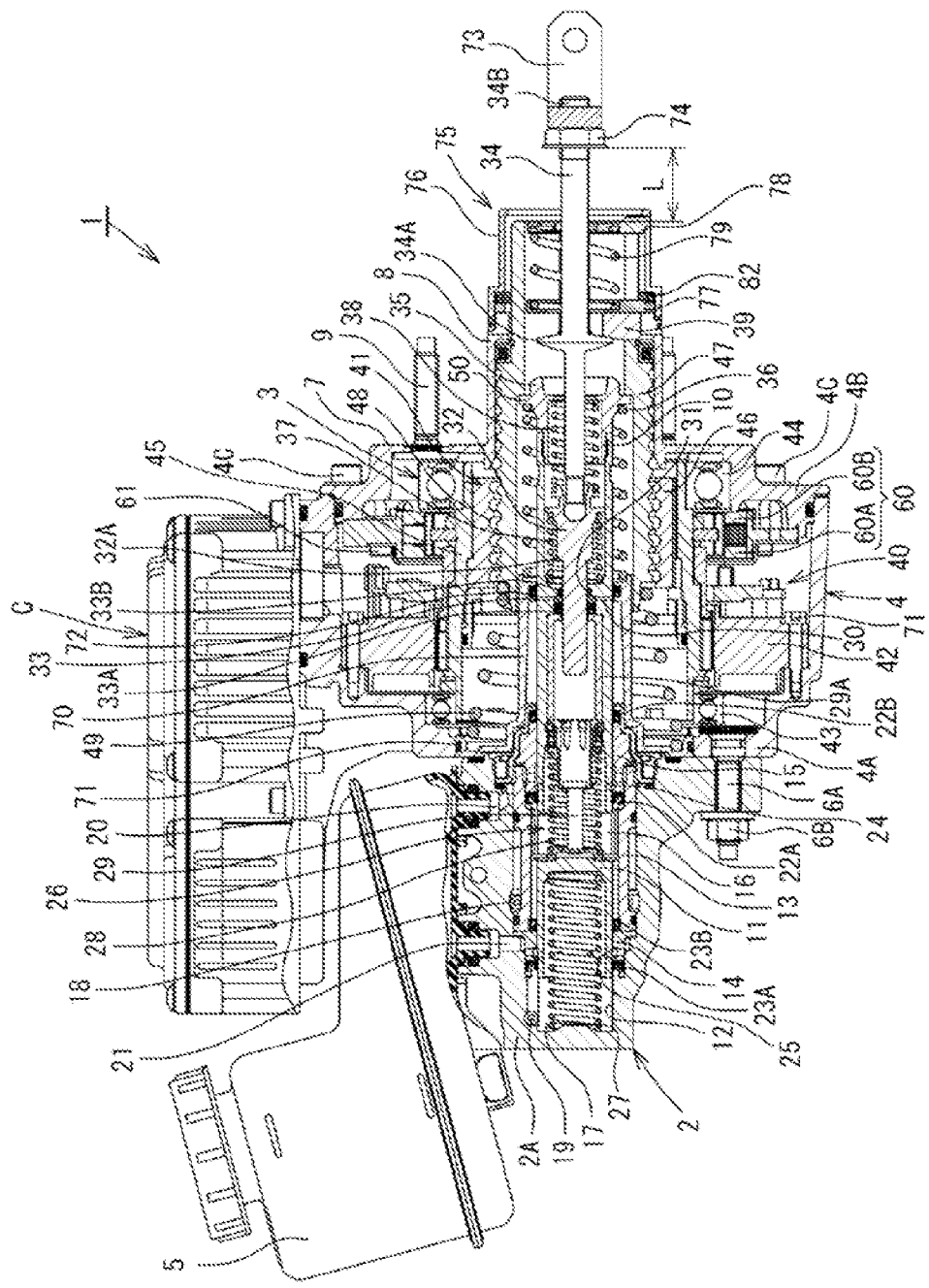
FIG. 1 is a vertical sectional view of an electric motor-driven booster according to one embodiment.
Figure 2:
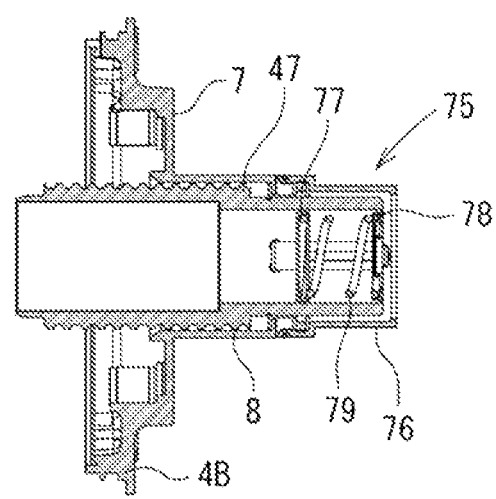
FIG. 2 is a vertical sectional view of a rear cover incorporating a reaction force mechanism of the electric motor-driven booster shown in FIG. 1.
Figure 3:
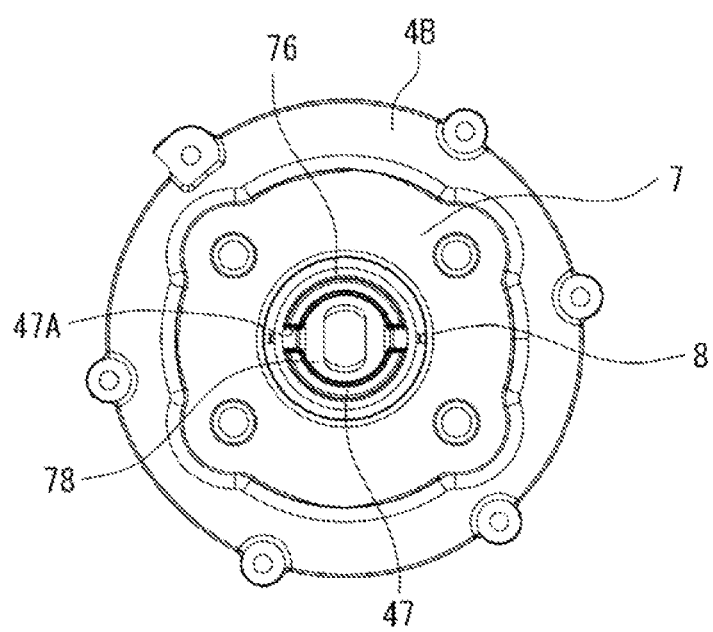
FIG. 3 is a front view of the rear cover of the electric motor-driven booster shown in FIG. 1.
Figure 4:
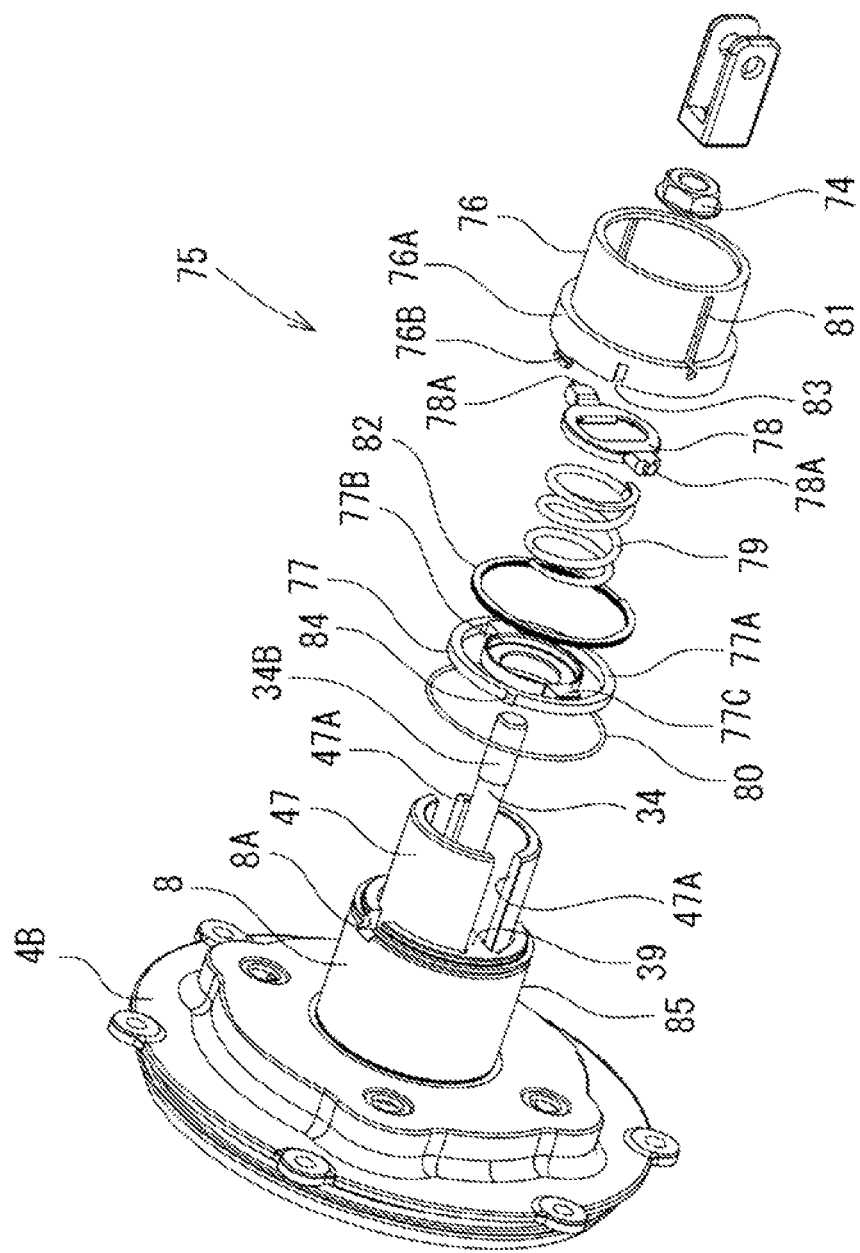
FIG. 4 is an exploded perspective view of the reaction force mechanism of the electric motor-driven booster shown in FIG. 1.
Figure 5:
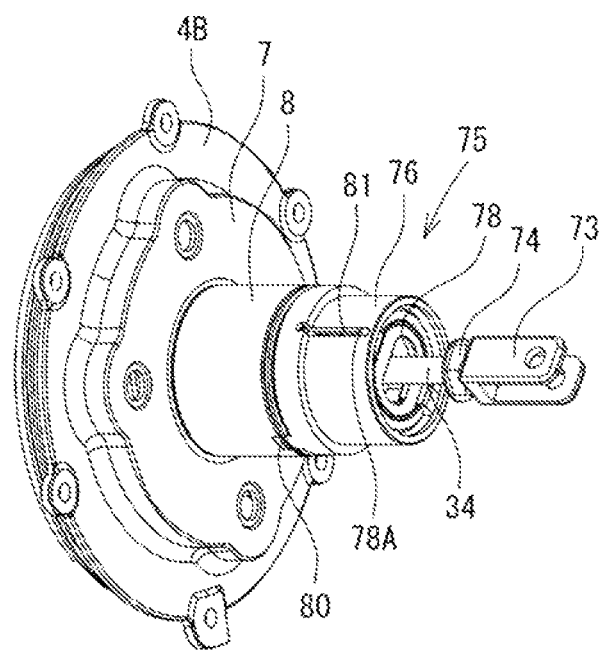
FIG. 5 is a perspective view of the rear cover incorporating the reaction force mechanism of the electric motor-driven booster shown in FIG. 1.

As shown in FIGS. 1 and 2, an electric motor-driven booster 1 has a tandem master cylinder 2 and a casing 4 containing an actuator 3. The master cylinder 2 is connected to a reservoir 5. The casing 4 has a controller C secured to the top thereof. The casing 4 has a casing body 4A in the shape of a substantially bottomed circular cylinder and a rear cover 4B fitted to the opening-side end of the casing body 4A and joined to the casing body 4A with a plurality of bolts 4C, thereby forming a housing accommodating the actuator 3.

The master cylinder 2 includes a cylinder body 2A in the shape of a substantially bottomed circular cylinder. The opening-side end of the cylinder body 2A is joined to the opening part at the bottom of the casing 4 with a stud bolt 6A and a nut 6B. A flat mounting bearing surface 7 is formed on the rear cover 4B of the casing 4, and a cylindrical portion 8 projects from the mounting bearing surface 7 in concentric relation to the master cylinder 2. The electric motor-driven booster 1 is disposed in an engine room of a vehicle. The electric motor-driven booster 1 is secured to a partition (dash panel) between the engine room and a vehicle compartment with a plurality of stud bolts 9 provided on the mounting bearing surface 7, with the cylindrical portion 8 extending through the partition into the vehicle compartment and with the mounting bearing surface 7 abutting against the partition.

The master cylinder 2 has a cylindrical primary piston 10 inserted in the opening-side part of the cylinder body 2A as a boosting member. The primary piston 10 has a cup-shaped distal end portion. The master cylinder 2 further has a cup-shaped secondary piston 11 inserted in the bottom-side part of the cylinder body 2A. The rear end portion of the primary piston 10 projects from the opening of the master cylinder 2 into the casing 4 to extend to the cylindrical portion 8 of the rear cover 4B. The primary piston 10 and the secondary piston 11 are slidably guided by annular guide members 14 and 15, respectively, disposed at the opposite ends of a sleeve 13 fitted in a cylinder bore 12 of the cylinder body 2A. The cylinder body 2A has two pressure chambers, i.e. a primary chamber 16 and a secondary chamber 17, formed therein by the primary piston 10 and the secondary piston 11. The primary chamber 16 and the secondary chamber 17 are provided with hydraulic pressure ports 18 and 19, respectively. The hydraulic pressure ports 18 and 19 are connected to hydraulic circuits of two systems (not shown) for supplying a hydraulic pressure to a brake caliper of each wheel.

The upper side of the side wall of the cylinder body 2A is provided with reservoir ports 20 and 21 for connecting the primary chamber 16 and the secondary chamber 17 to the reservoir 5. Two seal members 22A and 22B seal between the cylinder bore 12 of the cylinder body 2A and the primary piston 10, and two seal members 23A and 23B seal between the cylinder bore 12 of the cylinder body 2A and the secondary piston 11. The seal members 22A and 22B are disposed to axially face each other across the reservoir port 20. When the primary piston 10 is in a non-braking position shown in FIG. 1, the primary chamber 16 communicates with the reservoir port 20 through a port 24 provided in the side wall of the primary piston 10. When the primary piston 10 advances from the non-braking position toward the bottom of the cylinder body 2A, the primary chamber 16 is cut off from the reservoir port 20 by the seal member 22A. Similarly, the seal members 23A and 23B are disposed to axially face each other across the reservoir port 21. When the secondary piston 11 is in a non-braking position shown in FIG. 1, the secondary chamber 17 communicates with the reservoir port 21 through a port 25 provided in the side wall of the secondary piston 11. When the secondary piston 11 advances from the non-braking position, the secondary chamber 17 is cut off from the reservoir port 21 by the seal member 23A.

A spring assembly 26 is disposed in the primary chamber 16 between the primary piston 10 and the secondary piston 11. A return spring 27 is disposed in the secondary chamber 17 between the bottom of the master cylinder 2 and the secondary piston 11. The return spring 27 is a compression coil spring. The spring assembly 26 comprises a compression coil spring 28 held in a predetermined compressed state by an expandable retainer 29 so that the spring assembly 26 can be compressed against the spring force thereof. A cylindrical spacer 29A is interposed between the retainer 29 and an intermediate wall 30 (described later) of the primary piston 10.

The primary piston 10 has a cup-shaped distal end portion, a cylindrical rear portion, and an intermediate wall 30 axially dividing the interior of the primary piston 10. The intermediate wall 30 has a guide bore 31 extending therethrough in the axial direction. A small-diameter distal end portion of an input piston 32 is slidably and liquid-tightly inserted through the guide bore 31. The input piston 32 serves as a stepped input member having a step portion 32A. Two seal members 33A and 33B seal between the guide bore 31 and the input piston 32. The intermediate wall 30 of the primary piston 10 has a passage 33 diametrically extending therethrough. The passage 33 opens into the guide bore 31 at a position between the seal members 33A and 33B.

An intermediate portion of the primary piston 10 that extends into the casing 4 is axially slidably guided by being inserted into a cylindrical spring retaining member 70 fitted to the opening at the bottom of the casing body 4A. The spring retaining member 70 has an outer flange portion 71 formed at one end thereof. The flange portion 71 is fitted to the opening at the bottom of the casing body 4A, thereby allowing the spring retaining member 70 to be secured contiguously with the cylinder bore 12 of the master cylinder 2. The area between the spring retaining member 70 and the primary piston 10 is sealed by a seal member 72 secured to the inner periphery of the rear end of the spring retaining member 70. The passage 33 provided in the intermediate wall 30 of the primary piston 10 opens at the inner side of the seal member 72.

The rear end of the input piston 32 is connected to the distal end of an input rod 34 (input member) inserted into the cylindrical portion 8 of the rear cover 4B and further into the rear portion of the primary piston 10. The rear end of the input rod 34 extends from the cylindrical portion 8 to the outside. The input rod 34 has a thread portion 34B formed on the rear end portion thereof extending from the cylindrical portion 8 to the outside. The thread portion 34B is thread-engaged with a clevis 73 for connecting a brake pedal (not shown) to the input rod 34, and further engaged with a lock nut 74 (flange nut) as a fastening member for the clevis 73. The primary piston 10 has a flange-shaped spring retainer 35 secured to the rear end portion thereof. The primary piston 10 is urged in a retracting direction by a return spring 36, which is a compression coil spring, interposed between the rear end of the spring retaining member 70 and the spring retainer 35. The input piston 32 is resiliently held in a neutral position shown in FIG. 1 by springs 37 and 38, which are compression coil springs serving as a spring device. The spring 37 is interposed between the input piston 32 and the intermediate wall 30 of the primary piston 10. The spring 38 is interposed between the input piston 32 and the spring retainer 35. The retract position of the input rod 34 is defined by abutment of a large-diameter abutting portion 34A provided on an intermediate portion of the input rod 34 against a radially inwardly projecting stopper 39 provided at the rear end of the cylindrical portion 8 of the rear cover 4A.

The casing 4 is provided therein with an actuator 3 as an electric motor-driven actuator, which includes an electric motor 40 and a ball-screw mechanism 41 converting the rotation of the electric motor 40 into a rectilinear motion to apply thrust to the primary piston 10. The electric motor 40 is an interior permanent magnet synchronous motor, which includes a stator 42 and a rotor 45. The stator 42 has a plurality of coils secured to a step portion at the rear side of the bottom of the casing body 4A with a plurality of bolts 71. The rotor 45 is formed in a cylindrical configuration having a plurality of permanent magnets circumferentially disposed to face the inner peripheral surface of the stator 42. The rotor 45 extends axially from near the bottom of the casing body 4A to near the rear cover and is rotatably supported at both ends thereof by the casing body 4A and the rear cover 4B through bearings 43 and 44, respectively. It should be noted that the electric motor 40 may be other types of motors, e.g. a synchronous motor having permanent magnets disposed inside the rotor 45, or an induction motor.

The ball-screw mechanism 41 has a nut member 46, which is a rotating member, a hollow screw shaft 47, which is a rectilinear motion member, and a plurality of balls 48 loaded between screw grooves formed on the mutually opposing surfaces of the nut member 46 and the screw shaft 47. The nut member 46 is secured to the inner periphery of the rear portion of the rotor 45. The screw shaft 47 is inserted into the nut member 46 and the cylindrical portion 8 of the casing 4 and supported axially movably but non-rotatably about the axis. In the ball-screw mechanism 41, when the nut member 46 rotates in response to rotation of the rotor 45 of the electric motor 40, the balls 48 roll along the screw grooves, thereby causing the screw shaft 47 to move axially. The ball-screw mechanism 41 allows rotation and rectilinear motion to be converted into each other between the nut member 46 and the screw shaft 47. It should be noted that, in this embodiment, the rotation of the electric motor 40 may be transmitted to the ball-screw mechanism 41 after reducing the speed of the rotation through a publicly known speed reduction mechanism, e.g. a planetary gear mechanism, or a differential speed reducing mechanism, which is disposed between the electric motor 40 and the ball-screw mechanism 41.

The screw shaft 47 of the ball-screw mechanism 41 is urged in a retracting direction by a return spring 49, which is a tapered compression coil spring interposed between the screw shaft 47 and the flange portion 71 of the spring retaining member 70. The retract position of the screw shaft 47 is restricted by abutment of the rear end thereof against the stopper 39 provided on the cylindrical portion 8 of the rear cover 4B. The screw shaft 47 has the rear end portion of the primary piston 10 inserted therein. The retract position of the primary piston 10 is restricted by abutment of the spring retainer 35 against a step portion 50 formed on the inner periphery of the screw shaft 47. Thus, the primary piston 10 advances by being pressed by the step portion 50 as the screw shaft 47 advances, and also can advance solely away from the step portion 50. As shown in FIG. 1, the non-braking position of the primary piston 10 is defined by the step portion 50 of the screw shaft 47 abutting against the stopper 39, and the retract position, i.e. non-braking position, of the secondary piston 11 is defined by the primary piston 10 when in the non-braking position and the maximum length of the spring assembly 26.

The casing 4 is provided therein with a resolver 60 as a rotational position sensor for detecting the rotational position of the rotor 45 of the electric motor 40. The resolver 60 comprises a sensor rotor 60A secured to the outer periphery of the rear portion of the rotor 45, and a sensor stator 60B attached to the rear cover 4B with bolts 61 to face the sensor rotor 60A.

A reaction force mechanism 75 as a reaction force application device is provided at the rear end of the cylindrical portion 8 of the rear casing 4B. The reaction force mechanism 75 will be explained with reference also to FIGS. 2 to 5. As shown in FIGS. 2 to 5, the reaction force mechanism 75 substantially comprises a cylindrical cover member 76, a fixed spring retainer 77, a movable spring retainer 78, and a reaction force spring 79 as a spring member. The cover member 76 is attached to the rear end of the cylindrical portion 8 of the rear cover 4B to cover the outer periphery of the screw shaft 47. The fixed spring retainer 77 is secured in abutment with the rear end of the cylindrical portion 8 in the cover member 76. The movable spring retainer 78 is axially movably provided in the cover member 76. The reaction force spring 79 is a compression coil spring interposed between the fixed spring retainer 77 and the movable spring retainer 78.

The rear end portion of the screw shaft 47 that projects from the cylindrical portion 8 has guide grooves 47A formed at two diametrically opposing positions. The guide grooves 47A extend axially to the end of the screw shaft 47. The guide grooves 47A are engaged with the stopper 39 of the cylindrical portion 8 to support the screw shaft 47 axially movably but non-rotatably about the axis.

The cover member 76 has a stepped configuration having an enlarged-diameter portion 76A formed at the proximal end thereof. The cover member 76 is attached to the cylindrical portion 8 by fitting the enlarged-diameter portion 76A to the outer periphery of a small-diameter step portion formed at the end of the cylindrical portion 8. The cover member 76 has an engaging portion 76B extending axially from the end of the enlarged-diameter portion 76A and having a distal end portion projecting radially outward. The engaging portion 76B is engaged in a cut portion 8A formed at the end of the cylindrical portion 8, and a retaining ring 80 is fitted in an outer peripheral groove 85 formed on the end of the cylindrical portion 8 across the cut portion 8A, and engaged with the engaging portion 76B, thereby securing the cover member 76 to the cylindrical portion 8. The cover member 76 is provided with a pair of guide grooves 81 at two diametrically opposing positions to extend axially from the enlarged-diameter portion 76A.

The fixed spring retainer 77 has a large-diameter annular portion 77A abutting against the end of the cylindrical portion 8, a small-diameter annular portion 77B inserted into the screw shaft 47, and a connecting portion 77C extending in the diametrical direction to connect together the large-diameter annular portion 77A and the small-diameter annular portion 77B. The fixed spring retainer 77 abuts against the end of the cylindrical portion 8, with the connecting portion 77C fitted into the guide grooves 47A of the screw shaft 47. The fixed spring retainer 77 has a spring washer 82 superimposed thereon and is pressed and secured through the spring washer 82 to a step portion in the enlarged-diameter portion 76A of the cover member 76 attached to the cylindrical portion 8. The large-diameter annular portion 77A has a positioning projection 84 projecting radially outward therefrom. The positioning projection 84 engages in a cut portion 83 formed at the end of the enlarged-diameter portion 76A of the cover member 76 to perform positioning in the circumferential direction. The small-diameter annular portion 77B of the fixed spring retainer 77 has a recess formed to receive one end of the reaction force spring 79.

The movable spring retainer 78 has a pair of guide portions 78A projecting diametrically outward from an annular portion through which the input rod 34 is inserted. The guide portions 78A are formed integral with the annular portion. The pair of guide portions 78A are engaged at their distal ends in the guide grooves 81, respectively, of the cover member 76, with their proximal ends disposed in the guide grooves 47A, respectively, of the screw shaft 47. In other words, the guide portions 78A are inserted in the guide grooves 47A of the screw shaft 47 and guided at their distal ends along the guide grooves 81. Further, the guide portions 78A are axially movable within the range of the guide grooves 81 and supported in a radial direction (i.e. a direction perpendicular to the direction of movement of the input piston 32). The guide grooves 81 extend into the enlarged-diameter portion 76A of the cover member 76. Accordingly, the guide portions 78A can be inserted into the guide grooves 81 from the enlarged-diameter portion 76A. The annular portion of the movable spring retainer 78 has an inner diameter set so that the edge of the opening of the annular portion abuts against the lock nut 74. The annular portion of the movable spring retainer 78 has a recess formed to receive the other end of the reaction force spring 79.

The reaction force spring 79 is interposed between the fixed spring retainer 77 and the movable spring retainer 78 in the state of being in its free length or compressed by a predetermined set load (in this embodiment, in the state of being slightly compressed from the free length state in order to minimize play between the component parts). When the input rod 34 advances by a predetermined distance L relative to the cylindrical portion 8, i.e. the casing 4, the lock nut 74 abuts against the movable spring retainer 78. When the input rod 34 further advances, the reaction force spring 79 is compressed, and the spring force of the reaction force spring 79 is applied as a reaction force to the advancement of the input rod 34.

In addition, the electric motor-driven booster 1 is connected with various sensors (not shown) such as a stroke sensor detecting the displacement of the brake pedal, that is, the displacement of the input piston 32 and the input rod 34, a current sensor detecting an electric current supplied to the electric motor 40, and hydraulic pressure sensors detecting the hydraulic pressures in the primary and secondary chambers 16 and 17. The controller C is a microprocessor-based electronic controller including an ECU and a RAM, which controls the rotation of the electric motor 40 on the basis of detection signals from the various sensors.

Next, the operation of the electric motor-driven booster 1 will be explained.

When the brake pedal is actuated to advance the input piston 32 through the input rod 34, the controller C detects the displacement of the input piston 32 with the stroke sensor. The controller C controls the operation of the electric motor 40 on the basis of the displacement of the input piston 32 to advance the primary piston 10 through the ball-screw mechanism 41. Consequently, the primary piston 10 follows the displacement of the input piston 32. As the primary piston 10 advances, a hydraulic pressure is generated in the primary chamber 16, and the hydraulic pressure is transmitted to the secondary chamber 17 through the secondary piston 11. Thus, the brake hydraulic pressure generated in the master cylinder 2 is supplied to the brake caliper of each wheel through the hydraulic pressure ports 18 and 19, thereby generating a braking force in the vehicle. When the brake pedal operation is canceled, the input piston 32, the primary piston 10 and the secondary piston 11 retract, and thus the brake hydraulic pressure in the master cylinder 2 is reduced, thereby allowing the brake pads 66 to retract to cancel the braking. Because the primary piston 10 and the secondary piston 11 operate in the same way, the following explanation will be made on only the primary piston 10.

During the above, a part of the hydraulic pressure in the primary chamber 16 is received by the input piston 32, and the reaction force therefrom is fed back to the brake pedal through the input rod 34. Thus, a desired braking force can be generated with a predetermined boost ratio. Further, the boost ratio can be adjusted by adjusting the relative positions of the input piston 32 and the primary piston 10, which follows the input piston 32. In this regard, because the spring forces of the spring 37 and 38 act on the input piston 32, the reaction force to the input rod 34 can be appropriately adjusted, and thus the adjusted boost ratio can be maintained. The boost ratio can be increased by adjusting the displacement of the primary piston 10 forward relative to the displacement of the input piston 32, and the boost ratio can be reduced by adjusting the former backward relative to the latter. Thus, the electric motor-driven booster 1 can execute brake control operations such as boost control, brake assist control, vehicle stability control, inter-vehicle control, and regenerative cooperative control. It should be noted that the amount of regeneration during regenerative cooperative control can be increased by reducing the hydraulic braking force through reduction of the boost ratio by adjusting so that the primary piston 10 is backward relative to the input piston 32, thereby reducing the hydraulic pressure in the primary chamber 16.

Figure 6:
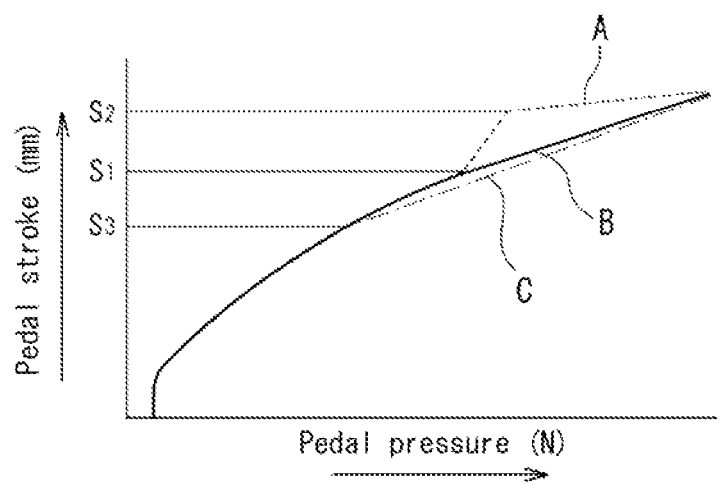
FIG. 6 is a graph showing the relationship between the pedal stroke and the pedal pressure in the electric motor-driven booster shown in FIG. 1.

The electric motor 40 has a predetermined maximum output. The maximum output of the electric motor 40 may be determined to be a maximum possible output obtainable by the supply of electric power, or an output obtained during the supply of a maximum electric power previously determined to prevent damage to the electric motor 40 by the supply of excessive electric power. When the output of the electric motor 40 controlled by the controller C reaches the maximum output and the hydraulic pressure in the primary chamber 16 and the thrust of the primary piston 10 balance with each other, the primary piston 10 becomes unable to advance further and thus stops. If the brake pedal is further depressed in such a full-load state, only the input piston 32 advances in response to the advancement of the input rod 34, with the primary piston 10 remaining stopped. However, because the primary piston 10 is at rest, the brake pedal depression causes a reduction in the rate of increase in the reaction force, which is fed back to the brake pedal through the input piston 32 and the input rod 34, due to the increase in the hydraulic pressure in the primary chamber 16 with respect to the amount of advancement of the input piston 32. Consequently, the relationship between the stroke of the brake pedal and the reaction force fed back to the brake pedal, i.e. pedal pressure, changes. The relationship will be explained based on FIG. 6 showing the relationship between the pedal stroke and the pedal pressure (=reaction force). In FIG. 6, when the pedal stroke reaches a position S1, a full-load state is reached. Thereafter, the rate of increase in the reaction force (pedal pressure) to the brake pedal decreases. Therefore, as shown by the dotted line A in FIG. 6, the pedal stroke increases rapidly as compared with the increase in pedal pressure (reaction force) and moves quickly to a position S2 at which the input piston 32 abuts against the primary piston 10. During this time, the firm feel to the brake pedal degrades undesirably.

In contrast to the above, in this embodiment, when the distance of movement of the input piston 32 relative to the casing 4 in response to the operation of the brake pedal reaches a predetermined distance L, the lock nut 74 abuts against the movable spring retainer 78 of the reaction force mechanism 75. Thereafter, the reaction force spring 79 is compressed by further advancement of the input rod 34, and consequently, the spring force of the reaction force spring 79 is applied to the brake pedal as a reaction force. The spring force of the reaction force spring 79 has been set to provide a reaction force only sufficient to compensate for a redaction in the rate of increase in the reaction force to the input rod 34 and the brake pedal when the output of the electric motor 40 reaches a predetermined maximum output. Consequently, as shown by the solid line B in FIG. 6, the reduction in the rate of increase in the reaction force due to the stop of the primary piston 10 can be compensated for by the spring force of the reaction force spring 79 of the reaction force mechanism 75. Therefore, it is possible to maintain the firm feel to the brake pedal and hence possible to ease discomfort the driver feels due to the reduction in the rate of increase in the reaction force after the output of the electric motor 40 has reached the maximum output as a result of the driver depressing the brake pedal deeply.

As the brake pedal is further depressed, the step portion 32A of the input piston 32 abuts against the intermediate wall 30 of the primary piston 10. As a result of this abutment, the primary piston 10 advances together with the input piston 32, causing an increase in the reaction force due to the increase in the hydraulic pressure in the primary chamber 16. At this time, discomfort the driver feels due to a sharp increase in the rate of increase in the reaction force can be eased because an appropriate reaction force is being applied to the brake pedal operation by the reaction force mechanism 75.

The travel distance L, through which the input rod 34 moves relative to the casing 4 to allow the lock nut 74 to abut against the movable spring retainer 78 and to thus activate the reaction force mechanism 75, has been set so that discomfort caused by the reduction in reaction force due to the increase in the hydraulic pressure in the primary chamber 16 can be eliminated by the spring force of the reaction force spring 79 when the output of the electric motor 40 reaches the maximum output. In this case, the travel distance L is preferably set by taking into account various conditions such as the maximum output of the electric motor 40 set by the controller C, the pressure-receiving area of the input piston 32, and the hydraulic stiffness of a hydraulic brake circuit connected to the master cylinder 2. The travel distance L is preferably set to a length at which the lock nut 74 abuts against the movable spring retainer 78 before the output of the electric motor 40 reaches the predetermined maximum output as a result of the advancement of the input rod 34 (see a position S3 on the one-dot chain line C in FIG. 6) or when the input rod 34 advances to or to near a position at which the predetermined maximum output is reached (the term "near" means to include positions before and after the position at which the maximum output is reached). By so doing, it is possible to maintain the firm feel to the brake pedal and hence possible to ease discomfort the driver feels due to the reduction in the rate of increase in the reaction force.

Here, the above-described one-dot chain line C in FIG. 6 shows the relationship between the pedal stroke and the pedal pressure in a case where the travel distance L terminates at S3 in FIG. 6 and the lock nut 74 abuts against the movable spring retainer 78 of the reaction force mechanism 75 at S3. In this case, the spring force of the reaction force spring is larger than the spring force of the reaction force spring 79 shown by the solid line B in FIG. 6. Therefore, the rate of increase in the pedal stroke with respect to the pedal pressure decreases from the position S3, but the change of the rate of increase in the pedal stroke is gentler than in the case of the dotted line A. Accordingly, it is possible to ease discomfort the driver feels due to a sharp increase in the rate of increase in the reaction force even in the case shown by the one-dot chain line in FIG. 6.

Also in a case where the pedal stroke position at which the lock nut 74 abuts against the movable spring retainer 78 is after the position where the predetermined maximum output is reached, discomfort feeling given to the driver can be eased because the amount of stroke where the rate of increase in the reaction force fed back to the brake pedal decreases can be made small.

It should be noted that, when the brake pedal is depressed deeply during running of the vehicle under ordinary driving conditions, a more-than-sufficient braking force is generated, and anti-lock brake control is executed to adjust the output of the electric motor 40 in the decreasing direction before the output of the electric motor 40 reaches the maximum output. Therefore, there is no possibility of the lock nut 74 abutting against the movable spring retainer 78 to activate the reaction force mechanism 75. On the other hand, when the brake pedal is depressed deeply while the vehicle is at rest, anti-lock brake control is not executed. Therefore, the output of the electric motor 40 can reach the maximum output. Accordingly, it is possible to ease discomfort the driver feels due to a sharp change in the rate of increase in the reaction force with respect to the pedal stroke by the operation of the reaction force mechanism 75.

In the above-described embodiment, the cover member 76 and the movable spring retainer 78 may be omitted, and a tapered coil spring (not shown) may be used as a reaction force spring. In such a case, the system is arranged such that the small-diameter end portion of the tapered coil spring is axially movably guided by the input rod 34 and that the lock nut 74 abuts against the small-diameter end portion. In this case, however, the reaction force spring is placed in a free-length state because a set load cannot be applied thereto.

Next, a modification of the reaction force mechanism 75 will be explained with reference to FIG. 7.

It should be noted that, in the following description, members or portions similar to those of the above-described embodiment are denoted by the same reference numerals as used in the embodiment and that only the points in which the modification differs from the foregoing embodiment will be explained in detail.

Figure 7:
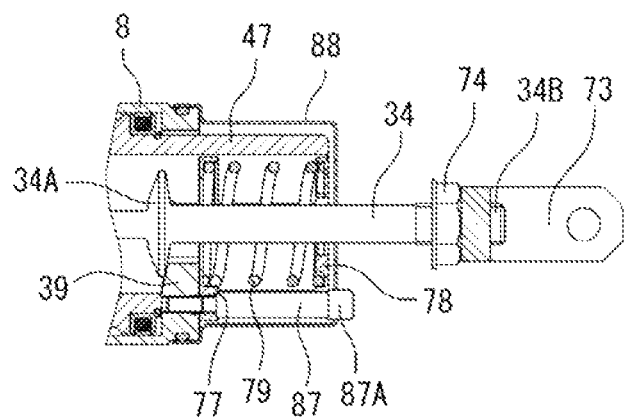
FIG. 7 is a vertical sectional view showing a modification of the reaction force mechanism of the electric motor-driven booster shown in FIG. 1.

In the modification shown in FIG. 7, the cover member 76 is omitted, but instead an axially extending pin-shaped guide member 87 is stood on the end of the cylindrical portion 8. The guide member 87 guides the movable spring retainer 78 axially movably within a predetermined range.

The guide member 87 has a thread portion formed at one end thereof. The thread portion is inserted through the fixed spring retainer 77 and screwed into the end of the side wall of the cylindrical portion 8 where the stopper 39 is provided, thereby securing the guide member 87 to the cylindrical portion 8, together with the fixed spring retainer 77. Further, the guide member 87 is inserted through the movable spring retainer 78 to guide the movable spring retainer 78 axially movably and to limit the movable range of the movable spring retainer 78 by a large-diameter portion 87A provided at the other end thereof, thereby retaining the reaction force spring 79 in a compressed state with a predetermined set load.

A bottomed cylindrical cover 88 is attached to the end of the cylindrical portion 8 to cover the rear end portion of the screw shaft 47 that projects from the cylindrical portion 8.

Thus, it is possible to offer advantageous effects similar to those of the foregoing embodiment.

In the foregoing embodiment, the present invention has been explained with regard to an electric motor-driven booster equipped with a tandem master cylinder 2 having hydraulic pressure ports 18 and 19 of two systems, by way of example. It should, however, be noted that the present invention is not limited to the above but applicable to an electric motor-driven booster using a single-type master cylinder without the secondary piston 11 and the secondary chamber 17. Although the foregoing embodiment uses the ball-screw mechanism 41, it is also possible to use other publicly known rotation-rectilinear motion conversion mechanisms.

Further, although the foregoing embodiment uses a structure in which both the input piston and the piston are inserted in the master cylinder 2 (i.e. a structure in which the input piston 32 is slidably and liquid-tightly inserted through the guide bore 31 of the primary piston 10), it is not always necessary to use a structure in which the input piston is inserted into the master cylinder. For example, the present invention is applicable to a "brake-by-wire" type brake system in which the pressure on the brake pedal is not transmitted directly to the master cylinder, as disclosed in Japanese Patent Application Publication No. 2008-30599. With such a structure, the rate at which the pedal pressure increases (firm feeling) can be gradually increased by the reaction force spring until the gap between the input member and the piston in the master cylinder disappears in the full-load state of the electric motor. Therefore, discomfort feeling given to the driver can be lessened advantageously.

REFERENCE SIGNS LIST

1: electric motor-driven booster
2: master cylinder
10: primary piston (boosting member)
32: input piston (input member)
34: input rod (input member)
40: electric motor (electric motor-driven actuator)
75: reaction force mechanism (reaction force application device)

The invention claimed is:

1. An electric motor-driven booster comprising
an input member movable to advance and retract in response to an operation of a brake pedal;
a boosting member provided to be movable relative to the input member, the input member being abuttable against the boosting member when the input member advances;
an electric motor-driven actuator adapted to drive the boosting member, an operation of the electric motor-driven actuator being controlled based on movement of the input member so as to adjust relative positions of the input member and the boosting member to generate a brake hydraulic pressure in a master cylinder with a desired boost ratio;
a spring device disposed between the boosting member and the input member and configured to bias the input member against the booster relatively in a rearward direction;
a movable spring retainer that is disposed closer to the brake pedal than the spring device and is configured to abut against the input member when the input member advances to near where an output of the electric motor-driven actuator reaches a predetermined maximum output; and
a reaction force spring configured to bias the input member through the movable spring retainer toward the brake pedal with the input member and the movable spring retainer contacting each other.

2. The electric motor-driven booster of claim 1, wherein, when the input member advances to near where an output of the electric motor-driven actuator reaches a predetermined maximum output as a result of advancement of the input member, the reaction force spring applies, to the advancement of the input member, a reaction force only sufficient to compensate for a reduction in a rate of increase in reaction force to the input member due to a fact that the electric motor-driven actuator has reached the maximum output and is unable to further increase the output.

3. The electric motor-driven booster of claim 2, further comprising:
a fixed spring retainer secured to a housing which accommodates the input member, the boosting member and the electric motor-driven actuator, the reaction force spring being interposed between the fixed spring retainer and the movable spring retainer; and
a cover member secured to the housing to cover the reaction force spring and configured to guide the movable spring retainer along a direction of movement of the input member.

4. The electric motor-driven booster of claim 3, wherein the cover member supports the movable spring retainer in a direction perpendicular to the direction of movement of the input member.

5. The electric motor-driven booster of claim 3, wherein the input member has a clevis for connecting the input member to the brake pedal, the clevis being attached to the input member by using a lock nut, so that the input member abuts against the movable spring retainer through the lock nut.

6. The electric motor-driven booster of claim 2, further comprising:
a fixed spring retainer secured to a housing which accommodates the input member, the boosting member and the electric motor-driven actuator,
wherein the reaction force spring is interposed between the fixed spring retainer and the movable spring retainer; and
a guide member secured to the housing and extended in a direction of movement of the input member to secure the fixed spring retainer to the housing and configured to guide the movable spring retainer along the direction of movement of the input member.

7. The electric motor-driven booster of claim 1, further comprising a fixed spring retainer secured to a housing which accommodates the input member, the boosting member and the electric motor-driven actuator,
the reaction force spring being interposed between the fixed spring retainer and the movable spring retainer; and
a cover member secured to the housing to cover the reaction force spring and configured to guide the movable spring retainer along a direction of movement of the input member.

8. The electric motor-driven booster of claim 7, wherein the cover member supports the movable spring retainer in a direction perpendicular to the direction of movement of the input member.

9. The electric motor-driven booster of claim 7, wherein the input member has a clevis for connecting the input member to the brake pedal, the clevis being attached to the input member by using a lock nut, so that the input member abuts against the movable spring retainer through the lock nut.

10. The electric motor-driven booster of claim 1, further comprising:

a fixed spring retainer secured to a housing which accommodates the input member, the boosting member and the electric motor-driven actuator, the reaction force spring being interposed between the fixed spring retainer and the movable spring retainer; and a guide member secured to the housing and extended in a direction of movement of the input member to secure the fixed spring retainer to the housing and configured to guide the movable spring retainer along the direction of movement of the input member.

11. The electric motor-driven booster of claim 1, wherein the input member has a clevis for connecting the input member to the brake pedal, the clevis being attached to the input member by using a lock nut, so that the input member abuts against the movable spring retainer through the lock nut.

* * * * *